Figure 1:
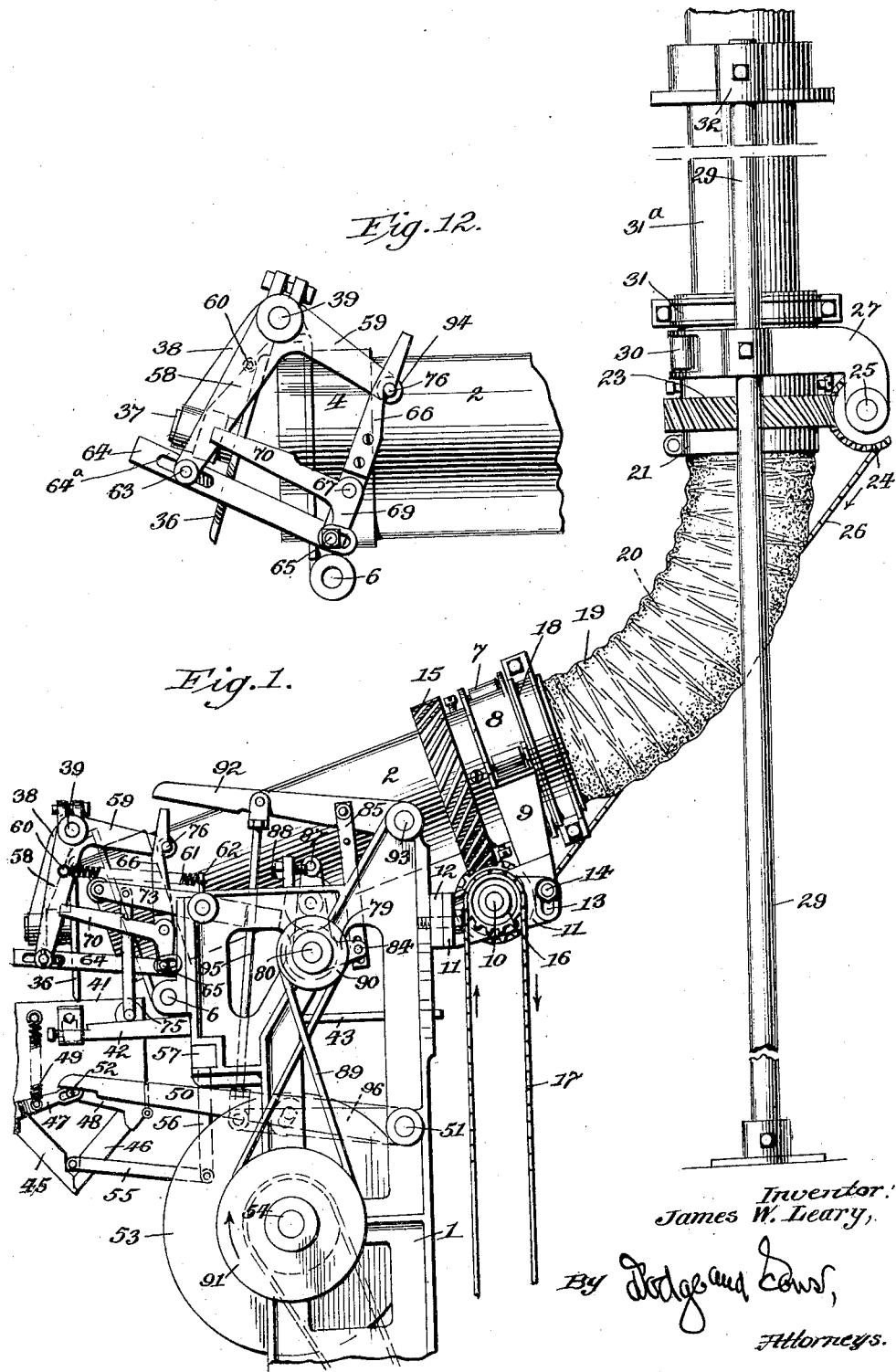

J. W. LEARY.
FEEDING MECHANISM.
APPLICATION FILED APR. 11, 1919.

1,413,038.

Patented Apr. 18, 1922.
6 SHEETS—SHEET 1.

Inventor:
James W. Leary,
By Dodge and Sons,
Attorneys.

J. W. LEARY.
FEEDING MECHANISM.
APPLICATION FILED APR. 11, 1919.

1,413,038.

Patented Apr. 18, 1922.

Inventor;
James W. Leary,

By Dodge and Sons,
Attorneys.

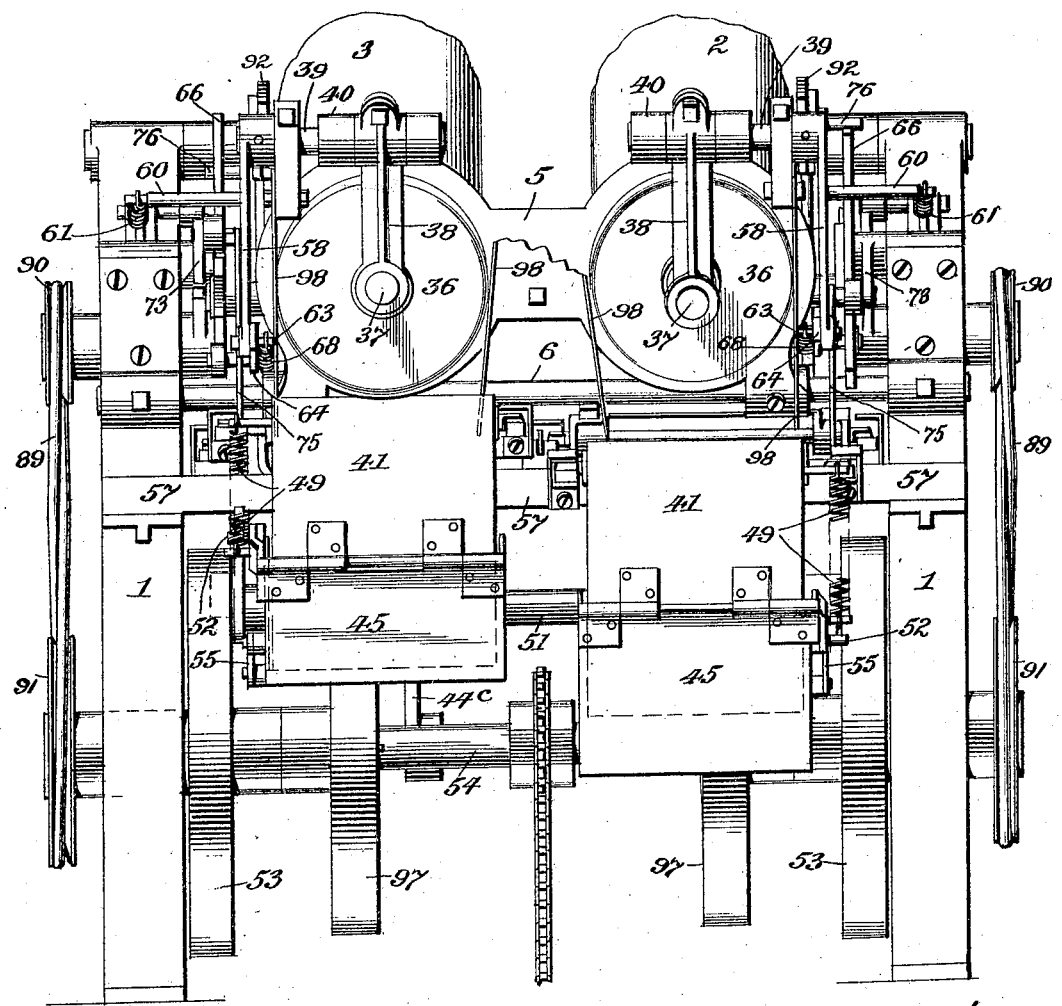

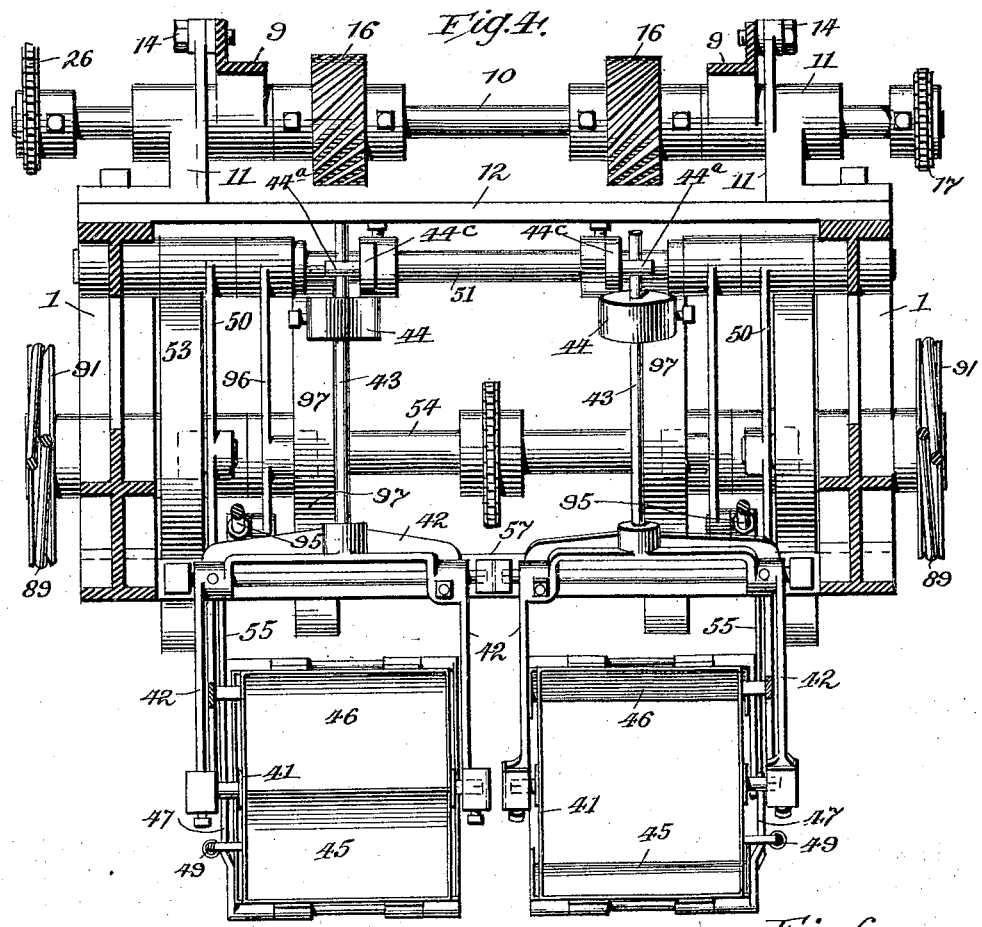
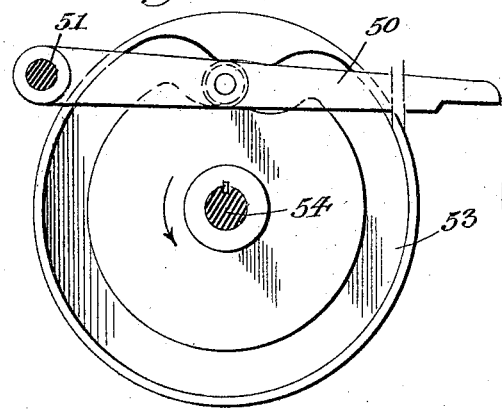
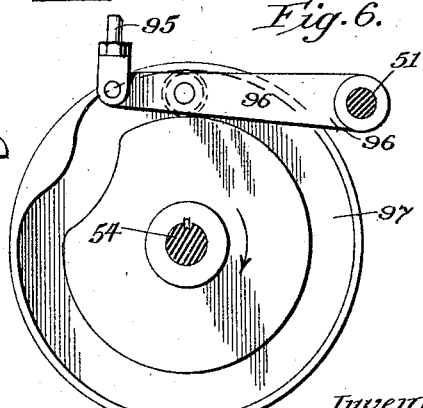

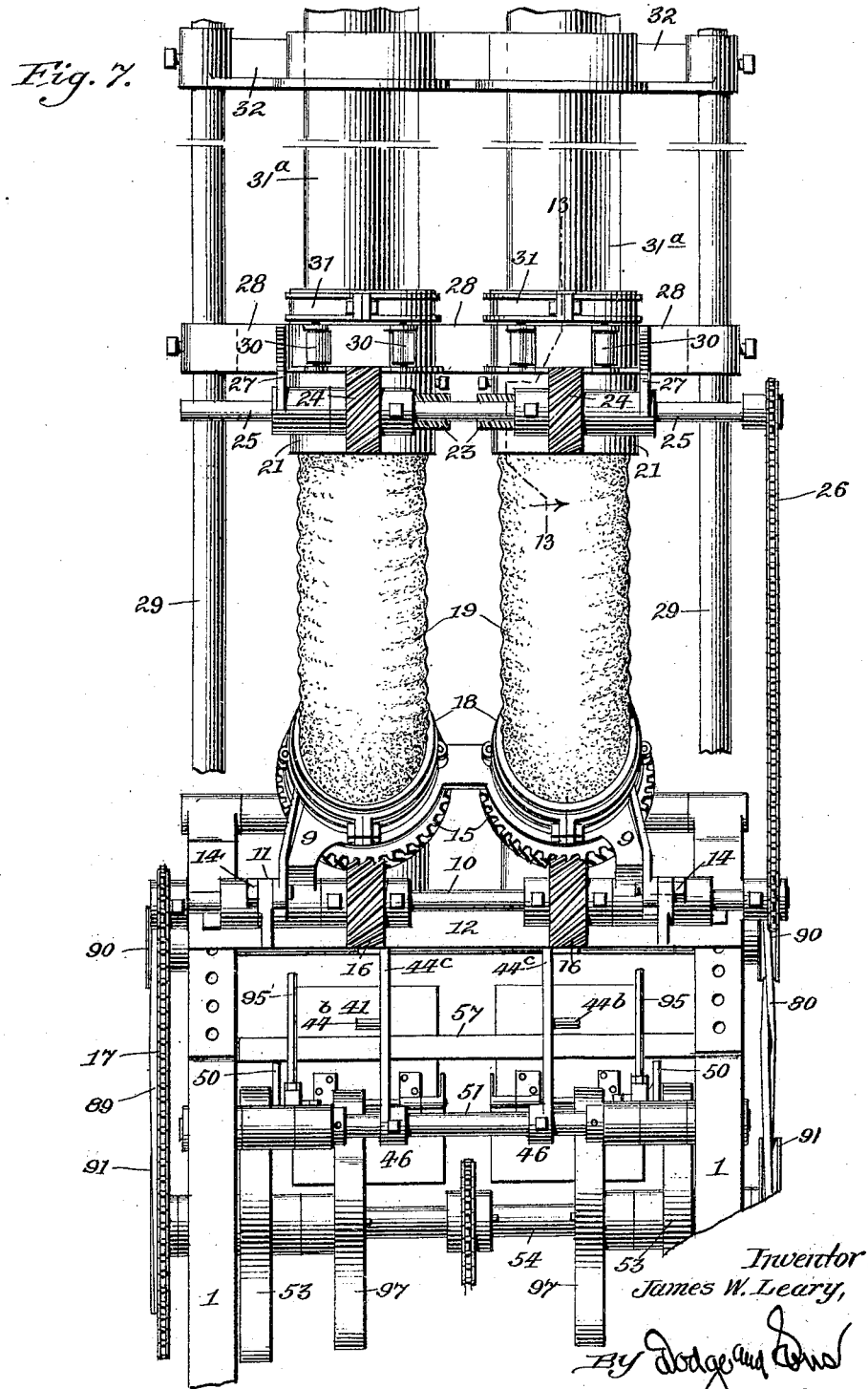

J. W. LEARY.
FEEDING MECHANISM.
APPLICATION FILED APR. 11, 1919.
1,413,038.
Patented Apr. 18, 1922.
6 SHEETS—SHEET 6.
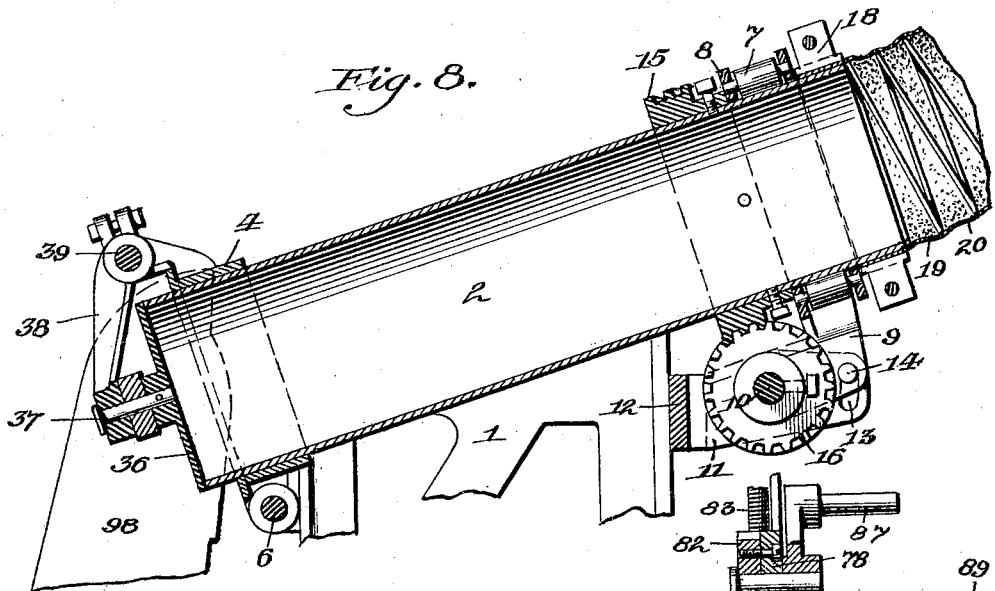
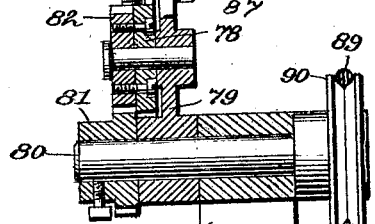
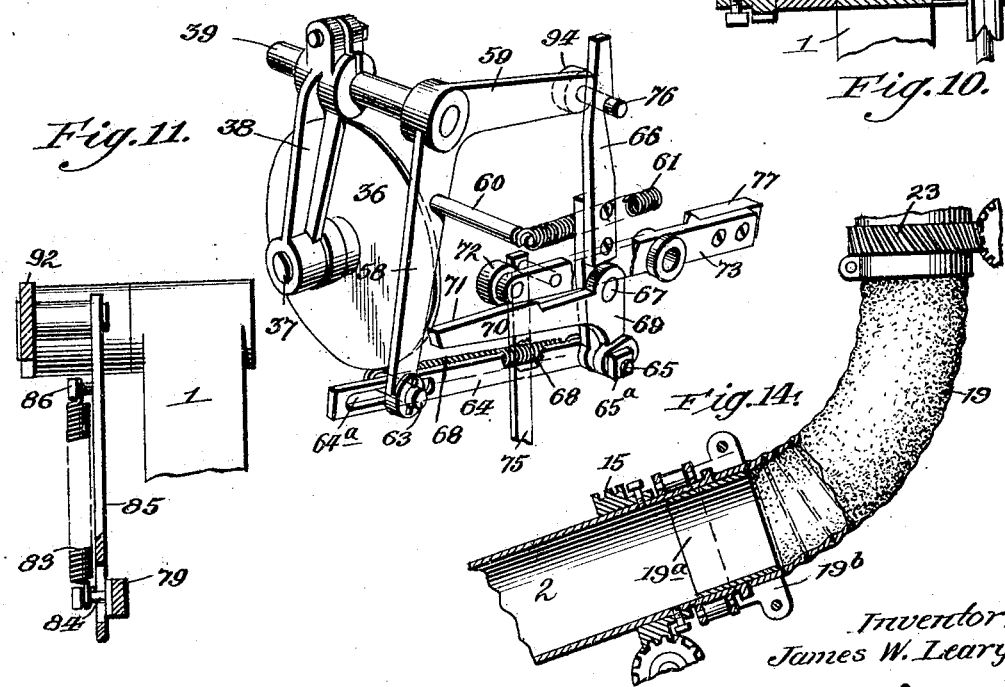
Inventor:
James W. Leary,
By Dodge and Sons,
Attorneys.

UNITED STATES PATENT OFFICE.

JAMES W. LEARY, OF HOLLIS, NEW YORK, ASSIGNOR TO AUTOMATIC PACKING & LABELING COMPANY, OF DURHAM, NORTH CAROLINA, A CORPORATION OF NORTH CAROLINA.

FEEDING MECHANISM.

1,413,038.

Specification of Letters Patent.  Patented Apr. 18, 1922.

Original application filed October 9, 1916, Serial No. 124,646. Divided and this application filed April 11, 1919. Serial No. 289,378.

*To all whom it may concern:*

Be it known that I, JAMES W. LEARY, a citizen of the United States, residing at Hollis, in the county of Queens and State of New York, have invented certain new and useful Improvements in Feeding Mechanism, of which the following is a specification.

My present invention pertains to an improved feeding mechanism, and is designed more particularly for use in connection with materials which are not susceptible of being handled by various force-feed mechanisms now commonly employed. Certain materials are more or less adherent in their nature, and are incapable of being handled and weighed with that accuracy and precision necessary to produce packages of a given and uniform weight.

The main object of the present invention is to produce a machine capable of securing such result, and with materials of the character just noted, as well as with other materials. To that end, a gravity feed is employed and the feeding devices or mechanisms are rotated or oscillated so that the material is compelled to move along through such devices. The arrangement is such that the material will bulk up in the discharge end of the feed device, thereby producing a bulk charge, and will produce a dribble feed to deposit the exact weight in the scale-pan after the bulk charge has passed into the scale pan.

A simple embodiment of the invention is illustrated in the annexed drawings, a twin or double machine being shown, though, as will be readily appreciated, one or three or more units may be employed, as desired.

In the drawings:

Figure 1 is a side elevation of the machine, the discharge gate of the rotary feeder being open and the scale-pan elevated and receiving a charge;

Fig. 2 a similar view of the lower portion of the mechanism on an enlarged scale, with the discharge gate closed and the scale dumping;

Fig. 3 a front elevation, with the flexible feed tubes or conduits omitted as in Fig. 2;

Fig. 4 a horizontal sectional view, on the line 4—4 of Fig. 2;

Figs. 5 and 6 are views of the operating cams;

Fig. 7 a rear elevation, with parts omitted for the sake of clearness;

Fig. 8 a longitudinal section of the discharge feed tube;

Fig. 9 a perspective view of the gate for the tube and its allied operating parts;

Figs. 10 and 11 detail sectional views, on the lines 10—10 and 11—11, respectively, of Fig. 2;

Fig. 12 a detail view, showing the adjustment of the parts when the discharge tube lies in a horizontal position;

Fig. 13 a detail vertical sectional view on the line 13—13 of Fig. 7, illustrating the upper end of the flexible feed tube and the supporting and driving elements therefor; and Fig. 14 a detail view illustrating a modification of the invention.

Referring to the drawings, 1 denotes the main or fixed frame of the machine upon which the various shafts and other operating elements find their support. The bulking and feeding chambers are designated by 2 and 3, and inasmuch as the parts allied and operative therewith are duplicated, a description of one unit will be given and like parts in the other set or unit similarly numbered.

The bulking chamber as shown takes the form of a cylinder, the lower or discharge end whereof finds its bearing in a sleeve 4, Fig. 8, carried by a frame or casting 5, Fig. 3, supported by a cross-bar 6, secured in the side members of frame 1. The upper or rear end of the chamber is supported by rollers 7, carried by a collar 8, said collar being provided with a downwardly extending, L-shaped arm 9, the inner end whereof is swiveled or mounted on a cross shaft 10. Said shaft finds its bearings in brackets 11, see Fig. 4, which extend outwardly from a cross bar 12, adjustably secured as to height to the side elements of the main frame. Thus, the bearing or collar 8, and consequently the intake end of the bulking chamber, may be raised or lowered by raising or lowering the cross bar 12 and the parts supported thereby,—this to effect a change in the pitch of the chamber, the lower end whereof swivels on the cross-bar 6 during such adjustment. The brackets 11 extend rearwardly alongside the arms 9, and are each provided with a slot 13. A machine screw 14, passing through said slot and into the adjacent arm 9, holds the arm in its adjusted position with reference to the bracket to ensure proper alinement of bearing 8 and the lower sleeve 4 of the bulking chamber under all adjustments of the bulking chamber.

A worm wheel 15 is secured to the bulking chamber, said wheel meshing with a worm gear 16, secured upon shaft 10, motion being imparted to the shaft through a sprocket-chain 17.

Secured to the upper or intake end of the bulking chamber by means of a clamp 18 is a flexible tube 19, shown in the present instance as formed of duck or the like, and having therein a spirally formed spring 20, the convolutions whereof are preferably out of contact. Any form of flexible tube may be employed, as for instance, rubber which may have a distending wire embedded therein, such tube being well known and frequently employed in conjunction with suction machines and the like, see Fig. 14. In fact, any tube which, by reason of its construction will remain distended while being turned or oscillated about its axis and when curved laterally as shown herein, may be employed. The upper end of the flexible tube is secured by a clamp 21, Figs. 1, 7 and 13, to the lower end of a vertically-disposed tube or sleeve 22, said tube (see Fig. 13) being provided at its lower end with an inwardly projecting lip $22^a$, the purpose of which will presently appear. Said tube is rotated through a worm-wheel 23, secured thereto, the wheel being driven by a worm gear 24 secured upon a shaft 25, which shaft in turn receives its motion from shaft 10 through a sprocket chain 26. Shaft 25 is mounted in brackets 27, Figs. 1 and 7, which extend outwardly from a cross frame 28, which at its ends is secured upon vertically disposed fixed rods 29. Frame 28 is provided with roller bearings 30, for the tubes 22, and collars 31 secured to the tubes, maintain them in place. A second cross frame 32, is secured to the rods 29 and serves to position the lower ends of the feed pipes or conduits $31^a$ in the tubes 22, Fig. 13.

From the foregoing it will be readily understood that the chamber 3, tube 19, and sleeve or tube 22 may be rotated, and the material being fed does not have a chance to arch or lodge in the members, except as it is periodically held in the lower end of the bulking chamber, as will presently appear.

The material passing down through pipe $31^a$ contacts with lip $22^a$ and is retarded and in a measure temporarily supported thereby. The lip tends to prevent the material from compacting and arching and acts in a sense as a stirrer, so that the material is in proper condition to feed down through tube 19 and is fed more uniformly than it otherwise would be.

The driving mechanism for the feed tubes 19 and the bulking chambers may be so arranged as to impart an oscillating motion to said parts instead of a continuous rotary movement, which may be of advantage in the handling of certain materials. So, too, the tube and chamber may be driven independently of each other, and one rotated or oscillated in opposition to the other, and an arrangement which will permit of these manipulations is illustrated in Fig. 14, wherein the tube 19 is provided with a collar $19^a$ at its lower end which extends into the upper end of the bulking chamber 2. A flanged split collar $19^b$ serves to clamp the tube to the collar and also to provide a connection between the parts which, while permitting separate rotation of the tube and bulking chamber, prevents endwise separation thereof. The upper end of the tube will be supported and driven in the manner shown in detail in Fig. 13.

The flexibility of the tube, which is held distended by the spring, or by reason of the inherent construction of the tube, allows of ready adjustment of the bulking chamber, the pitch whereof will be arranged so as to suit the material being handled, free-running material requiring less pitch of the chamber than those materials which have a tendency to adhere or pack-up in the conduit, composed of the pipe or tube 22, tube 19, and the bulking chamber 2. Furthermore, the tube 19, by reason of the fact that it lies in a curve, is being constantly distended and contracted, that is to say, taking a portion or space extending lengthwise of the tube, it will be distended or fully drawn out when it lies in the lower plane of the tube, but when said portion reaches the upper position it is contracted and forms itself into a series of ridges and depressions, or may be said to be puckered (see Fig. 1), which tends to loosen any adherent material.

The lower end of the bulking chamber is closed by a gate 36 (Fig. 8) said gate having secured thereto a pin 37, which is rotatably mounted in the lower end of an arm or lever 38, the arm at its upper end being secured upon a shaft 39. Said shaft 39 is journaled in a pair of lugs 40, Fig. 3, which extend upwardly from casting 5, above the upper portion of the discharge end of the bulking chamber.

Gate 36 controls the delivery of the material into the scale, denoted by 41, which lies below the discharge end of chamber 2. Said scale is sustained by a bifurcated scale beam 42, Fig. 4, provided with a rearwardly extending arm 43, carrying the usual adjustable weight 44. Stop pins $44^a$ and $44^b$ extending outwardly from a fixed arm $44^c$, Figs. 2, 4 and 7, serve to limit the downward and upward movements of the beam, and consequently the movement of the scale-pan. The scale is provided with doors 45 and 46, operatively connected by pin-jointed levers 47 and 48 and normally held closed by a spring 49. A lever 50, fulcrumed on rod 51, overlies the connecting pin 52 and acts to positively open the gates when the pan descends under full charge, the lever at such time being depressed through the action of a cam 53, secured upon a constantly-driven shaft 54, the scale-pan at such time being held from further descent by the stop pin 44ª, Fig. 2. A radius bar 55, connected at one end to the scale, and at its opposite end to the lower end of a downwardly extending post 56, serves to hold the scale steady in its upward and downward movements. Said post 56 is secured to a cross bar 57, which is connected to the side members of the main frame 1, the bar also forming the support for the scale beams.

Secured to the outer end of shaft 39, see Figs. 1, 2 and 9, is an elbow lever, one arm 58 of which extends downwardly and the other, 59, projects inwardly. A pin 60 extends outwardly from arm 58 and a spring 61 connected thereto and to a pin 62 carried by the frame 1, tends to rock the shaft 39 and to hold gate 36 closed. The lower end of arm 58 carries a laterally extending pin 63, which projects through a slot 64ª formed in one end of a link 64, the opposite end of the link carrying a pin 65. Said pin 65 extends through the lower end of the gate latch lever 66, which is fulcrumed on a stud 67 which extends outwardly from the fixed sleeve 4. A coiled spring 68 is interposed between pins 63 and 65. A second lever composed of arms 69 and 70 is fulcrumed on stud 67, the lower arm 69 being formed with an elongated slot through which the pin 65 passes, a nut 65ª mounted on pin 65 serving to lock lever 69—70 to lever 66 when the parts are brought to the desired adjustment. Arm 70 is provided with a contact face 71, which lies beneath a roller 72, mounted on the outer end of a lever 73, fulcrumed on a stub-shaft 74, extending from the frame. A link 75, pin-jointed to lever 73, projects downwardly therefrom and is connected to the scale-pan 41.

To facilitate the downward movement of the scale-pan and to prevent any faltering in the movement thereof, and also to allow the gate to close quickly when the pan begins its descent under full charge, lever 73 is provided at its inner end with a contact plate or number 77, adapted when the parts pass from the position shown in Fig. 1 to that in Fig. 2, to coact with a constantly revolving roller 78. Said roller is mounted on the upper arm of an elbow-lever 79, which lever, see Fig. 10, finds its bearing or fulcrum upon a rotating shaft 80, the shaft carrying a pinion 81, which meshes with a pinion 82, to which latter the roller 78 is secured. A spring 83 secured at one end to a pin 84, see Fig. 11, extending outwardly from the lower arm of lever 79, and through a slot in a link 85, and at its opposite end to a pin 86 extending outwardly from the link, tends to throw the roller 78 into the path of plate 77 and through the contact to positively rock lever 73. This movement effects the positive downward movement of the scale pan and a release of the latch. Lever 79 carries a stop pin 87, which coacts with a stop screw 88, Fig. 1, to limit the movement of the lever.

Motion is imparted to shaft 80 through a belt 89 which passes about a pulley 90 on said shaft and about a pulley 91 secured to shaft 54.

When the scale-pan begins to descend under load, it draws the link 75 down with it, thereby rocking lever 73 and throwing contact plate 77 into operative relation with the constantly revolving roller 78, which then positively moves the inner end of the lever upwardly and effects, through the connected link 75, a positive downward movement of the scale-pan. The movement of said lever 73 also causes the roller 72 to contact with face 71, thereby rocking lever 66 and withdrawing it from a latch stud 76, secured upon arm 59, allowing the gate to close under the action of spring 61. In the closing of the gate 36, as the roller 72 releases the latch lever 66 from engagement with the stud 76, pin 63 engages the inner end wall of slot 64ª, formed in link 64, and spring 68 then becomes ineffective and the further movement of the lever 69—70 is controlled by spring 61, which at such time is moving the gate to its closed position, the lever 70, and consequently the contact face 71, being moved away from roller 72 and brought to the position shown in Fig. 2.

Link 85 is connected at its upper end to a lever 92 fulcrumed on a shaft 93, the free end of the lever overlying a roller 94 carried by the arm 59. A link 95 extends from said lever to a lever 96 fulcrumed on rod 51, said latter lever being operated by a cam 97 mounted on shaft 54.

As the scale-pan begins to ascend at which time the doors 45 and 46 are closed, lever 92 begins its downward movement, link 85 being moved down thereby, and through contact of pin 84 with the upper end of the slot in the link will rock lever 79 and throw the constantly rotating roller 78 away from contact member 77 of lever 73, thereby allowing the lever to move independently of the rotating wheel. Lever 92 also contacts with roller 94 and depresses arm 59, thereby opening the gate and causing the latch lever 66 to come into operative locking position with stud or pin 76. After the gate is latched open lever 92 ascends, drawing link 85 upwardly and allowing lever 79 to be rocked by spring 83, so that roller 78 will stand in the path of contact element 77, preparatory to positively engaging it when lever 73 is again moved at the beginning of the descent of the scale pan. This position of the parts is maintained until the charge which was bulked in the bulking chamber is discharged into the scale and such additional amount is dribbled in from the rotating bulking chamber as is necessary to produce the requisite weight. The scale-pan then descends and the latch mechanism, the lever 73 and the allied parts are all actuated as above described. This cycle of operations is repeated, and the units preferably, though not necessarily, operate in alternation, one scale discharging and its bulking chamber bulking while the other chamber is discharging into the then closed scale.

To prevent the material from scattering, guide wings or plates 98 will preferably be placed at each side of the gates 36, the plates extending down into the scale-pan, as indicated in Fig. 3.

In Fig. 12 the bulking chamber is illustrated as horizontally disposed and the trip and latch mechanism is shown in its adjusted relation thereto.

No claim is made herein, either generically or specifically, to the mechanism for opening and closing the gate or for causing the positive descent of the scale, as that is set forth and claimed in my co-pending application Serial No. 58,638, filed on or about the 29th day of October 1915, now patent 1,283,227, dated October 29, 1918.

Furthermore, no claim is made herein to the weighing mechanism in conjunction with the allied parts, nor to the rotary or oscillating bulk and dribble feed chamber, such subjects matter forming the basis of my application Serial No. 124,646 filed on or about October 9th, 1916, of which this case is a division.

What is claimed is:

1. In a machine of the character specified, the combination of a rotary bulking chamber, the axis whereof is inclined from the vertical; a flexible tube one end whereof discharges into said chamber, while the opposite end extends upwardly and stands in a substantially vertical position; means for supporting said upper end; and means for rotating said upper end.

2. In a machine of the character specified, the combination of a rotary bulking chamber, the axis whereof is inclined from the vertical; a flexible tube one end whereof discharges into said chamber, while the opposite end extends upwardly and stands in a substantially vertical position; means for supporting said upper end; means for rotating said upper end; and a feed pipe discharging into said upper end.

3. In a machine of the character specified, the combination of a bulking chamber tubular in form; a feed pipe standing at an angle to the longitudinal axis of the chamber; a flexible tube extending from the pipe and discharging into the chamber; means associated with the tube to keep the same distended; and means for moving the tube about its axis.

4. In a machine of the character specified, the combination of a bulking chamber tubular in form; a feed pipe standing at an angle to the axis of the chamber; a flexible tube connecting the chamber and the pipe; and means for moving the tube about its axis.

5. In a machine of the character specified, the combination of a tubular member disposed at an angle to the vertical; a feed pipe; a flexible tube extending from the feed pipe and discharging into the tubular member; means for moving the flexible tube about its axis; and a gate controlling the discharge of material from the tubular member.

6. In a machine of the character specified, the combination of a frame; a tubular member; a pivotal support for one end of said member; a vertically adjustable support for the opposite end of said member; and means for moving said tubular member about its axis.

7. In a machine of the character specified, the combination of a frame; a tubular member; a pivotal support for one end of said member; a vertically-adjustable support for the opposite end of the member; means for moving said tubular member about its axis; and a flexible tube extending into the intake end of the tubular member.

8. In a machine of the character specified, the combination of a frame; a tubular bulking chamber; a support for the discharge end thereof, pivotally supported on the frame; a vertically-adjustable support for the intake end of said chamber; means for moving said chamber about its axis; a flexible tube discharging into the intake end of the chamber; and means serving to maintain the tube distended.

9. In combination with a feed pipe; a bulking chamber; a flexible tube connecting said chamber and pipe; and means for moving the chamber and pipe about their axes.

10. In combination with a feed pipe; a movable bulking chamber adjustable as to angular position; a flexible tube extending from the feed pipe and discharging into the chamber; and means for moving said tube and chamber about their axes.

11. In combination with a feed pipe; a tube-like chamber adjustable as to angularity; a flexible tube connecting the chamber and pipe; and means for rotating said chamber and tube in unison.

12. In combination with a feed pipe; a tube-like chamber; a tiltable bearing for the discharge end of the chamber; a vertically-adjustable bearing for the opposite end of the chamber; a feed pipe; a flexible tube extending from the feed pipe to the intake end of the tube-like chamber; means for maintaining the tube in its distended position; and means for rotating the chamber and tube.

13. The combination with a hollow feeding member having a curved axis one end of which is higher than the other; of means for bodily rotating said member about its axis to aid gravity in causing material by reason of the agitation of the material due to such rotation to be fed through said member in a curved course.

14. The combination with a hollow feeding member having a curved axis one end of which is higher than the other and substantially vertical; of means for bodily rotating said member about its axis to aid gravity in causing material by reason of the agitation of the material due to such rotation to be fed through said member in a curved course.

15. The combination with a hollow feeding member having a curved axis one end of which is lower than the other and approximately horizontal; of means for bodily rotating said member about its axis to aid gravity in causing material by reason of the agitation of the material due to such rotation to be fed through said member in a curved course.

16. The combination with a hollow feeding member having a curved axis one end of which is higher than the other and substantially vertical, the other end being approximately horizontal; of means for bodily rotating said member about its axis to aid gravity in causing material by reason of the agitation of the material due to such rotation to be fed through said member in a curved course.

17. The combination with a hollow feeding member having a curved axis one end of which is higher than the other but lying in the same vertical plane; of means for bodily rotating said member about its axis to aid gravity in causing material by reason of the agitation of the material due to such rotation to be fed through said member in a curved course.

18. The combination with a hollow feeding member of substantially uniform flexible material and having a curved axis, one end of which is higher than the other; of means for bodily rotating said member about its axis to aid gravity in causing material by reason of the agitation of the material due to such rotation to be fed through said member in a curved course.

19. The combination with a hollow feeding member of substantially uniform flexible material reinforced by stiffening material arranged to prevent collapse of the flexible material without affecting its flexibility and having a curved axis one end of which is higher than the other; of means for rotating said member on its axis to aid gravity in causing material to be fed through said member in a curved course.

20. The combination with a hollow feeding member of substantially uniform flexible material reinforced by stiffening wire circumferentially applied thereto and having a curved axis one end of which is higher than the other; of means for rotating said member on its axis to aid gravity in causing material to be fed through said member in a curved course.

21. The combination with a hollow feeding member having a curved axis one end of which is higher than the other; of means applied to both ends of and for rotating said member on its axis to aid gravity in causing material to be fed through said member in a curved course.

22. The combination with a hollow feeding member having a curved axis one end of which is higher than the other; of gearing applied to both ends of and for rotating said member on its axis to aid gravity in causing material to be fed through said member in a curved course.

23. The combination with a hollow feeding member having a curved axis one end of which is higher than the other; of means for bodily rotating said member about its axis to aid gravity in causing material by reason of the agitation of the material due to such rotation to be fed through said member in a curved course; and means for temporarily arresting the material fed.

24. The combination with a hollow feeding member having a curved axis one end of which is higher than the other; of means for bodily rotating said member about its axis to aid gravity in causing material by reason of the agitation of the material due to such rotation to be fed through said member in a curved course; and means co-operating with the lower end of the member for temporarily arresting the material fed.

25. The combination with a hollow feeding member having a curved axis one end of which is higher than the other; of means for bodily rotating said member about its axis to aid gravity in causing material by reason of the agitation of the material due to such rotation to be fed through said member in a curved course; and a gate co-operating with the lower end of said member for temporarily arresting the material fed.

26. The combination with a hollow feeding member having a curved axis one end of which is higher than the other; of means for rotating said member on its axis to aid gravity in causing material to be fed through said member in a curved course; and a source of material supply arranged and adapted to discharge material into said member.

27. The combination with a hollow feeding member having a curved axis one end of which is higher than the other; of means for rotating said member on its axis to aid gravity in causing material to be fed through said member in a curved course; and a source of material supply in open communication with the higher end of said member.

28. The combination with a hollow feeding member having a curved axis one end of which is higher than the other; of means for rotating said member on its axis to aid gravity in causing material to be fed through said member in a curved course; and a stationary source of material supply in open communication with the higher end of said member.

29. The combination with a hollow feeding member having a curved axis one end of which is higher than the other; of means for rotating said member on its axis to aid gravity in causing material to be fed through said member in a curved course; and a fixed stationary source of material located above and in open communication with the higher end of said member.

30. The combination with a hollow feeding member having a curved axis one end of which is higher than the other; of means for rotating said member on its axis to aid gravity in causing material to be fed through said member in a curved course; and means for transporting material away from said member.

31. The combination with a hollow feeding member having a curved axis one end of which is higher than the other; of means for rotating said member on its axis to aid gravity in causing material to be fed through said member in a curved course; and means for intermittently transporting material away from said member.

32. The combination with a hollow feeding member having a curved axis one end of which is higher than the other; of means for rotating said member on its axis to aid gravity in causing material to be fed through said member in a curved course; a source of material supply arranged and adapted to discharge material into said member; and means for transporting material away from said member.

33. In combination with a feed tube; a feed pipe discharging into the tube; means for rotating the tube; and a lip extending inwardly into the tube.

34. In combination with a feed tube; a feed pipe discharging into the tube; means for rotating the tube; and a lip extending into the tube and rotatable therewith.

35. In combination with a feed tube; a feed pipe discharging into the tube; means for rotating the tube; and means extending into the tube below the discharge end of the feed pipe for temporarily arresting the descent of the material being fed.

In testimony whereof I have signed my name to this specification.

JAMES W. LEARY